United States Patent [19]

Sato et al.

[11] 4,369,405
[45] Jan. 18, 1983

[54] ROTATIONAL POSITION DETECTING APPARATUS

[75] Inventors: Masahiro Sato, Toyoake; Kunio Makita, Chiryu, both of Japan

[73] Assignee: Nippondenso Co., Ltd., Kariya, Japan

[21] Appl. No.: 167,155

[22] Filed: Jul. 8, 1980

[30] Foreign Application Priority Data

Jul. 10, 1979 [JP] Japan .................. 54-95407[U]

[51] Int. Cl.³ ............................................ G01P 3/48
[52] U.S. Cl. .................................................. 324/174
[58] Field of Search .............. 324/174, 169, 168, 392; 73/117.3, 116; 364/551

[56] References Cited

U.S. PATENT DOCUMENTS 3,230,407  1/1966  Marsh, Jr. ................. 324/174 X
4,180,753 12/1979  Cook ......................... 324/174 X
4,190,798  2/1980  Fitzner ....................... 324/169
4,257,040  3/1981  Shirasaki et al. .......... 324/174 X

FOREIGN PATENT DOCUMENTS 2244935  4/1973  Fed. Rep. of Germany ...... 324/174
1053389 12/1966  United Kingdom ............... 324/174

Primary Examiner—Stanley T. Krawczewicz

Attorney, Agent, or Firm—Cushman, Darby & Cushman

[57] ABSTRACT

A rotational position detecting apparatus includes a rotating member magnetized to induce a large number of magnetic poles on the periphery thereof except at a portion indicative of a rotational reference position, and a pair of magnetically sensitive elements for detecting the magnetic flux from the magnetic poles so as to generate rotational angle signals and reference position signals. The pair of magnetically sensitive elements are positioned side by side such that their output signals generated in response to the magnetic flux from the magnetic poles are different in phase by half the period, and the difference between the outputs of the magnetically sensitive elements is obtained by a differential circuit whose output has an amplitude which is two times the amplitude of the outputs of the magnetically sensitive elements. The magnetic poles on the periphery of the rotating member are dropped out at the reference position in such a manner that the output AC component of the respective magnetically sensitive elements is dropped out at the reference position in a point symmetrical manner on both sides of the zero level of the AC component, thus stably supplying the rotational angle signals and the reference position signals.

3 Claims, 11 Drawing Figures 4,369,405

ROTATIONAL POSITION DETECTING APPARATUS

BACKGROUND OF THE INVENTION

The present invention relates to a rotational position detecting apparatus for supplying rotational angle signals as well as stable reference position signals.

Conventionally, electromagnetic sensors have been used frequently as the means of detecting rotational angles and the use of such sensor has given rise to such a problems as variation of the output with the rotational speed and the occurrence of magnetic interference when generating a composite signal. As a result, magnetically sensitive elements such as Hall devices or magneto-resistance elements have recently come into use. In a known rotational position detecting apparatus of the type employing such a magnetic sensing element, the magnetic field produced by a strong bias magnet is interrupted by a vane made of a magnetic material to thereby generate rotational position signals. However, this type is disadvantageous in that the number of output signals that can be produced for every revolution is small and the diameter of the apparatus is large. Further, if it is desired to supply any reference position signal in addition to the rotational position signals, a larger and more complicated apparatus will be required. Another known apparatus of the type comprising a magnetic disk magnetized to induce a large number of poles on its surface and magnetically sensitive elements for detecting purposes is also disadvantageous in that while it is possible to use the magnetic disk which is small in size but has a large number of poles, the surface magnetic flux density cannot be made so large and the output of the magnetically sensitive elements is low.

SUMMARY OF THE INVENTION

With a view to overcoming the foregoing deficiencies in the prior art, it is the object of the present invention to provide a compact rotational position detecting apparatus comprising a rotating member magnetized to induce on its surface as many poles as desired to generate a large number of angle signals for every revolution thereof. The rotating member has a portion thereof cut out for reference position signal generating purposes. A pair of magnetically sensitive elements arranged, in correspondence with the magnetization period, side by side in such positions that their output signals differ in phase by ½ period, whereby the difference between the outputs of the magnetically sensitive elements is detected to increase twofold the magnitude of the magnetically sensitive element output. The magnetic poles of the rotating member are dropped out at the reference position such that the output AC components of the magnetically sensitive elements are dropped out in a point symmetric manner on both sides of their zero level, thereby supplying for every revolution of the rotating member a large number of angle signals and at least one reference position indicative signal having greater accuracy and stability.

The apparatus of the present invention has a great advantage due to its notched or dropout structure which ensures that the differential output of the magnetically sensitive elements is greatly and stably dropped out at the reference position (or the notched portion), the temperature characteristics of the elements, magnet and circuits and their variations can be absorbed with the resulting great simplification (reduction in size and cost) in the construction of the circuits and other elements and simplification of the mounting accuracy. Another great advantage is that due to its pair of magnetically sensitive elements arranged such that their outputs have a phase difference of ½ period and their differential output is utilized, the S/N ratio of their signals is improved with the result that the angular accuracy of output signals is improved considerably and also the magnetization density of magnetic poles is increased, thus increasing the number of detection pulses per revolution of an object whose rotation is to be measured.

DESCRIPTION OF THE PREFERRED EMBODIMENTS

Figure 1:
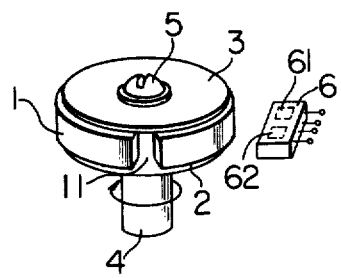
FIG. 1 is a perspective view showing an embodiment of the sensor construction in an apparatus according to the present invention.

Referring to FIG. 1 showing the overall construction of the sensor section in an apparatus of this invention, numeral 1 designates a magnetic disk or rotating member magnetized to induce a large number of north (N) and south (S) poles on the circumference with a portion thereof being cut out to form a notch or slot 11 as a reference position. Numeral 6 designates a sensor comprising a pair of magnetically sensitive elements or ferromagnetic-metal magneto-resistance elements 61 and 62 (e.g., the Sony DM 101). The notched portion of the slot 11 is one-half south pole plus one north pole long (S/2 pole + N pole). Numeral 4 designates a shaft adapted for rotation in synchronism with the rotation of an engine and having a magnetic disk holding plate 2 mounted thereon. Numeral 3 designates another magnetic disk holding plate firmly secured to the shaft 4 by a screw 5.

Figure 2:
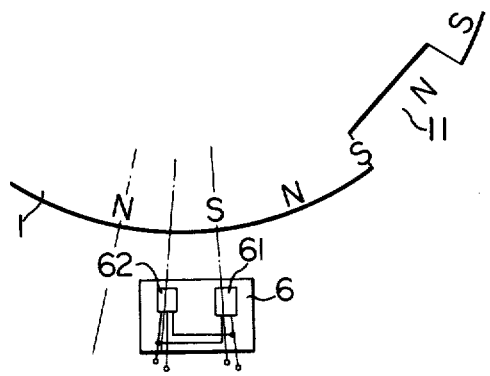
FIG. 2 is a schematic enlarged view of a principal part of the apparatus shown in FIG. 1.

FIG. 2 is an enlarged plan view of the slot 11 and the sensor 6. The sensor 6 comprises the pair of magneto-resistance elements 61 and 62 and the pitch ds between the elements is selected to be equal to one half the pitch dM between the north and south poles of the magnet. Namely, it is selected 2ds=dM.

Figure 3:
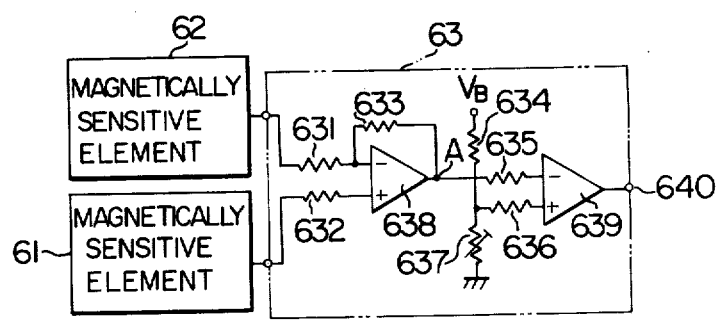
FIG. 3 is a circuit diagram showing an embodiment of the circuit construction of the apparatus according to the invention.

FIG. 3 is a circuit diagram of the apparatus, in which numeral 63 designates a waveform shaping circuit, 631 to 637 resistors, 638 a known type of differential amplifier (e.g., the RCA IC CA3130), and 639 a known type of comparator (e.g., the RCA IC CA139). Numeral 640 designates an output terminal, and $V_B$ a constant voltage supply terminal.

With the construction described above, the operation of this embodiment will now be described. When the shaft 4 is rotated in the direction of the arrow in response to an object whose rotation is to be measured, the magneto-resistance element 61 generates an output as shown by the solid line in (a) of FIG. 4 in response to the magnetic poles induced on the circumference of the magnetic disk 1. This waveform shows that one cycle of its AC output is dropped out at the reference position in a point symmetrical manner on both sides of the zero level. The magneto-resistance element 62 is displaced by one half the magnetization pitch (between the north and south poles) from the magneto-resistance element 61 so that its output waveform is delayed in phase by one half the period as shown by the solid line in (b) of FIG. 4. As a result, their differential output is produced by the differential amplifier 638 as shown by the waveform in (c) of FIG. 4 which is devoid of one half the amplitude at the portion corresponding to the notched position of the magnetic disk 1. This output is generated at the point A in the circuit of FIG. 3. Thus, once the resistor 637 has been set so that the threshold level of the comparator 639 becomes equal to the level of Vth which is slightly lower than the center value of the AC output, even if the amplitude of the signal shown in (c) of FIG. 4 varies, the comparator 639 stably generates as its output a dropout pulse signal whose pulse width is increased at the reference position R as shown in (d) of FIG. 4.

Generally, the magnetic force intensity of the magnetic disk 1 and the outputs of the magneto-resistance elements 61 and 62, respectively have a temperature characteristic and moreover the outputs of the magneto-resistance elements 61 and 62 are subject to great variation with variation in the mounting of the sensor 6 and the magnetic disk 1 relative to each other. As a result, in order to always generate a signal involving a dropout of its output pulse in correspondence with the notched portion of the magnetic disk 1, it is necessary to establish a wide output waveform dropout range which is greater than the range of variation in the output of the elements and sufficient to establish the threshold value. As regards the manner in which the magnetic disk 1 is notched, shown in (a) of FIG. 5 is the differential output waveform (the waveform at the point A of FIG. 3) obtained with only one north or south pole being simply dropped out. If the threshold level of the comparator 639 is established within the range Vth in the Figure, it is possible to produce a signal involving dropping out of its output pulses in correspondence with the notch of the disk 1. However, since the notch is small as compared with the range of variation in the output of the magneto-resistance elements 61 and 62 as mentioned previously, in certain circumstances no output pulse will be dropped out thus failing to provide a reference position signal. The output waveform shown in (b) of FIG. 5 is one obtained with the notch corresponding to two poles of the north and south poles and in this case the range Vth is also narrow. On the contrary, if the notching method of this invention is used which ensures that the output waveform always involves a dropout without exceeding the center line of the output AC component as shown in (c) of FIG. 5, the range Vth will be increased satisfactorily. It will thus be seen that if the notching method used is such that the outputs (the outputs of the individual elements) before differential amplification are dropped out in response to the notched portion of the disk 1 in a point symmetrical manner on both sides of the zero level of the output AC components as shown in (a) and (b) of FIG. 4, a signal having a portion of its output pulses dropped out as shown in (d) of FIG. 4 can be generated stably by the disk 1 in combination with the above-described sensor construction.

Figure 7:
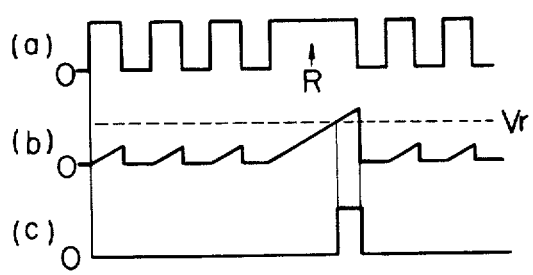
FIG. 7 shows a plurality of waveforms useful for explaining the operation of the circuit shown in FIG. 6.
Figure 6:
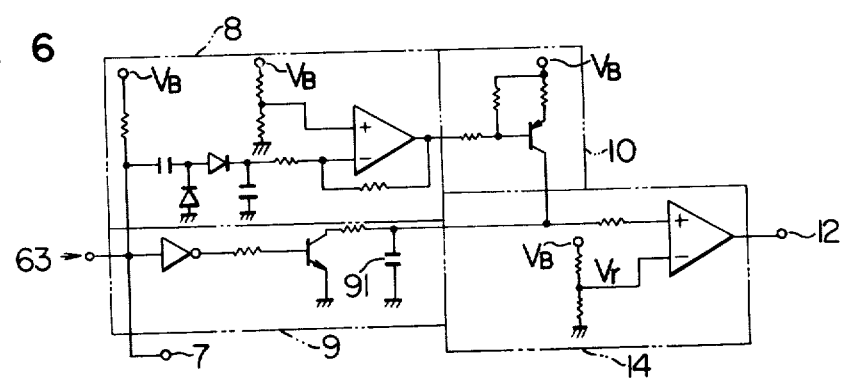
FIG. 6 is a circuit diagram showing an exemplary form of a reference signal shaping circuit used in the apparatus of this invention.

Next, an exemplary form of a reference signal shaping circuit for generating a reference position signal from the signal shown in (d) of FIG. 4 will be described in reference to FIG. 6. The output signal of the waveform shaping circuit 63 shown in (a) of FIG. 7 is applied to an angle signal output terminal 7 as well as a frequency-to-voltage converter circuit 8 and a triangular wave generating circuit 9. The output of the frequency-to-voltage converter circuit 8 which is proportional to the rotational speed is applied to a current regulator circuit 10 which in turn charges a capacitor 91 of the triangular wave generating circuit 9 with a current proportional to the rotational speed is shown in (b) of FIG. 7. The output voltage of the triangular wave generating circuit 9 is compared with a reference voltage Vr by a comparator circuit 14 so that due to the fact that the output voltage of the triangular wave generating circuit 9 exceeds the reference voltage Vr in response to the reference position R, a reference position signal is generated as shown in (c) of FIG. 7 and the signal is delivered from a reference position signal output terminal 12.

Figure 4:
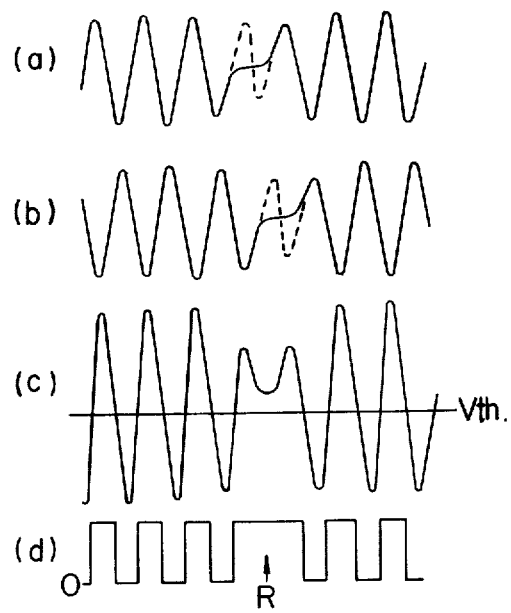
FIG. 4 shows a plurality of waveforms useful for explaining the operation of the circuit shown in FIG. 3.
Figure 5:
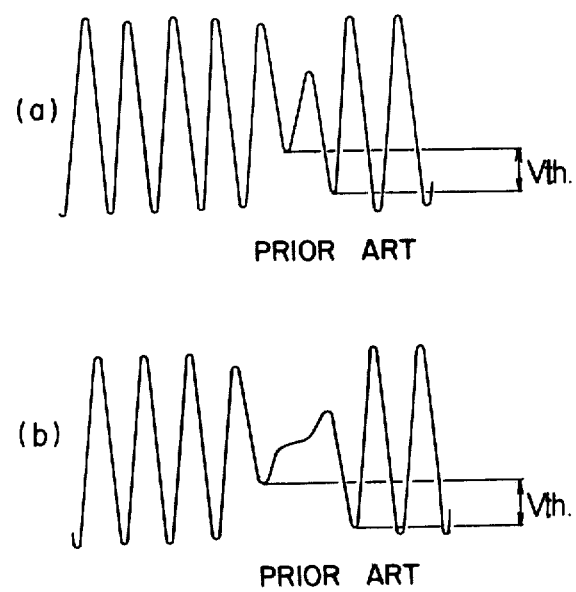
FIG. 5 shows a plurality of differential output waveforms useful for explaining the operation of the apparatus shown in FIG. 1.
Figure 8:
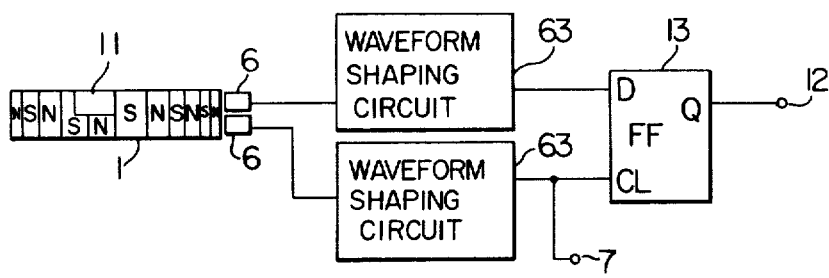
FIG. 8 is a circuit diagram showing another form of the reference signal shaping circuit.
Figure 9:
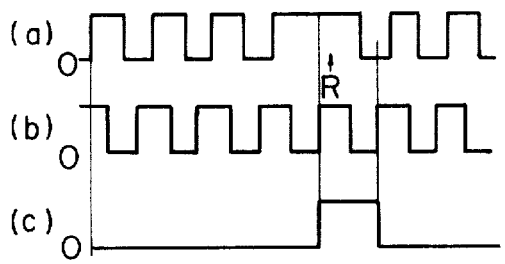
FIG. 9 shows a plurality of waveforms useful for explaining the operation of the circuit shown in FIG. 8.

The method of producing a reference position signal from the signal shown in (d) of FIG. 4 is not limited to the above-described one. For example, as shown in FIG. 8, the magnetic disk 1 may be formed thereon with two tracks one of which is dropped out at a reference position, whereby the magnetic poles on the tracks are sensed by the circuits of FIG. 3 which generate the dropout pulse signal shown in (a) of FIG. 9 and the angle signals shown in (b) of FIG. 9, so that the angle signals are delivered through an angle signal output terminal 7 and the dropout pulse signal is applied to the data terminal of a data flip-flop 13 whose clock terminal receives the angle signals thus generating at its Q output terminal the reference position signal shown in (c) of FIG. 9 and delivering the signal through a reference position signal output terminal 12.

Figure 10:
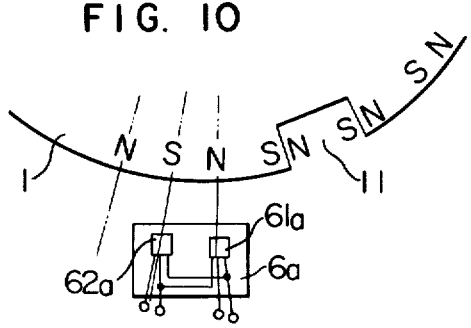
FIG. 10 is a schematic plan view showing another embodiment of the sensor construction in the apparatus according to the invention.

FIG. 10 shows another notching or dropout method using Hall devices as magnetically sensitive elements in place of the magneto-resistance elements 61 and 62. Also in the case of a sensor 6a comprising a pair of Hall devices 61a and 62a, if the magnetic disk 1 is simply formed with a slot 11, no pulse dropout will be caused in the signal subjected to differential amplification. Thus, as in the case of the magneto-resistance elements 61 and 62, it is necessary to notch the magnetic disk 1 in such a manner that the output waveforms before the differential amplification involve dropouts in a point symmetrical manner on both sides of the zero level of the output AC components as shown in (a) and (b) of FIG. 4, that is, an even number of magnetic poles are dropped out and thus after the differential amplification an output signal including a dropout is similarly generated. The same construction and circuits as used in the case of the magneto-resistance elements 61 and 62 can be used except that the dropout method consists of dropping out an even number of magnetic poles and the pitch of the Hall devices 61a and 62a is selected the same with the pitch of the north and south poles.

It is needless to say that with the embodiments described above, the similar effect can be obtained even if, for example, the notched portion is not in complete agreement with the previously mentioned S/2+N poles and hence there exists some difference therebetween.

Figure 11:
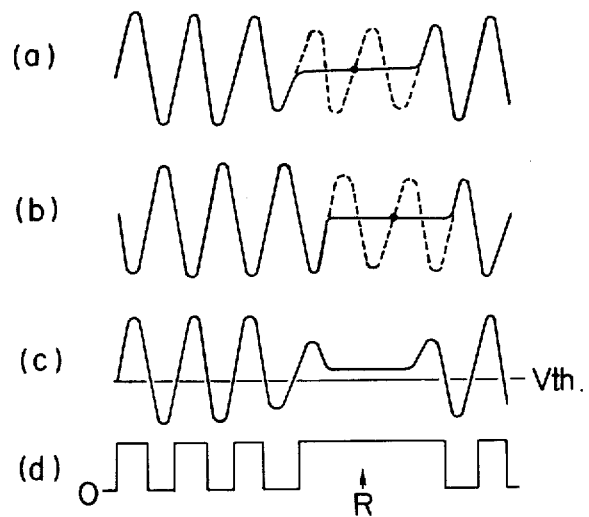
FIG. 11 shows a plurality of waveforms useful for explaining the operation of still another embodiment of the apparatus according to the invention.

Further, while only the combination of the magneto-resistance elements 61 and 62 with the S/2+N dropout method and the combination of the Hall devices 61a and 62a with the S+N dropout method are described in connection with the above embodiments, in accordance with the dropout methods stated in the appended claims the same effect can be obtained by the same construction only with variations in the number of dropout pulses. For example, where magneto-resistance elements are used so that their output waveforms become point symmetrical with the zero level of the AC components as the center as shown in (a) and (b) of FIG. 11, that is, in the case of a S/2+N+S dropout method, a differential amplifier output is generated as shown in (c) of FIG. 11. Thus, the same construction, operation and effect are ensured as mentioned previously, although the number of dropout pulses is increased by one as shown in (d) of FIG. 11.

We claim:

1. A rotational position detecting apparatus comprising:

rotating means including a plurality of magnetic poles induced on the periphery thereof except at a portion thereof indicative of a rotational reference position, each of said magnetic poles forming rotational angle information means;

a pair of magnetically sensitive means having a mounting pitch therebetween related to the pitch of the magnetic poles, and positioned to face said rotating means so as to generate outputs whose AC components are different in phase by one half period from each other; and a wavefore shaping circuit including a differential circuit for generating an output indicative of the difference between the output AC components of said pair of magnetically sensitive means, and a comparator for comparing the differential output of said differential circuit with a predetermined level to generate a rectangular wave output, wherein said magnetic poles of said rotating means are dropped out at said rotational reference position such that the output AC component of each of said magnetically sensitive means is dropped out at said reference position in a point symmetrical manner on both sides of the zero level thereof.

2. An apparatus as set forth in claim 1, wherein each of said magnetically sensitive means includes a ferromagnetic-metal magneto-resistance element, and wherein the pitch therebetween is one-half of the pitch between the magnetic poles, and wherein the magnetic poles of said rotating means are dropped out at said reference position over ($\frac{1}{2}$+n) poles thereof, said n being an integer.

3. An apparatus as set forth in claim 1, wherein each of said magnetically sensitive means includes a Hall device, and wherein the pitch therebetween is the same as the pitch between the magnetic poles, and wherein the magnetic poles of said rotating means are dropped out at said reference position over 2n poles thereof, said n being an interger.

* * * * *